C. S. ALLENDER & G. G. McNEE.
VALVE.
APPLICATION FILED APR. 25, 1913.
1,131,024.
Patented Mar. 9, 1915.
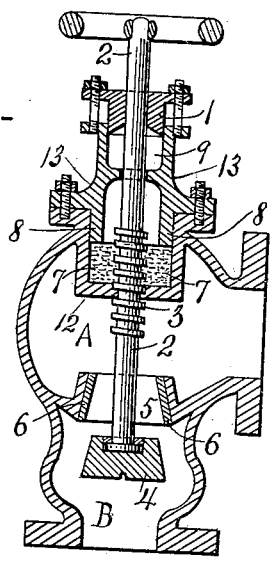
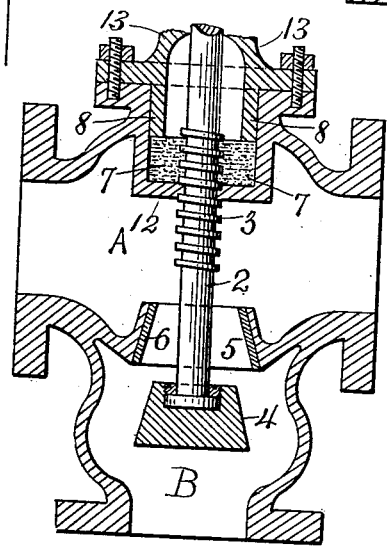
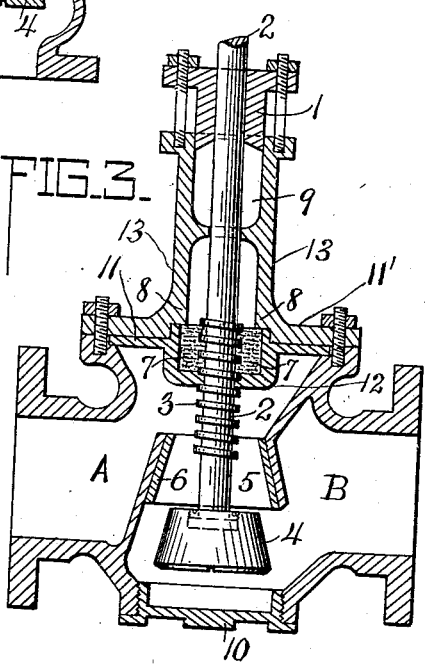
WITNESSES
INVENTORS
Charles S. Allender
George G. McNee
By H. W. Stackpole Attorney

UNITED STATES PATENT OFFICE.

CHARLES S. ALLENDER AND GEORGE G. McNEE, OF CLAY CENTER, KANSAS.

VALVE.

1,131,024.

Specification of Letters Patent. Patented Mar. 9, 1915.

Application filed April 25, 1913. Serial No. 763,557.

*To all whom it may concern:*

Be it known that we, CHARLES S. ALLENDER and GEORGE G. McNEE, citizens of the United States, residing at Clay Center, in the county of Clay and State of Kansas, have invented certain new and useful Improvements in Valves, of which the following is a specification.

Our invention relates to valves for steam engines and various other appliances in which valves are used as blow-off-valves or for regulating the supply of steam, water or other fluids, gases and so forth; and the objects are to construct an effective valve which shall be simple, strong, durable and easily operated.

We attain these objects by means of the mechanism hereinafter described, reference being had to the accompanying drawings, in which—

Figure 1 is a sectional view of an angle valve; Fig. 2, a sectional view of a cross valve and Fig. 3, a sectional view of our improved globe valve.

Similar numerals and letters of reference indicate like parts throughout the several views.

As distinctive from the construction of the valves now in general use the stem 2 passes through the orifice 5 and the disk 4 is seated without the chamber A and within the inflow chamber B. The seat is fitted with bush 6. The stem 2 is provided with the usual screw-thread 3 seated in the stuffing-box 12, which may be integral with the body as shown in Figs. 1 and 2 or separate from the body but secured thereto; one manner of which is shown in Fig. 3 as a removable stuffing box. Bush 7 is held firmly in place by shoulder 8 on hub 13. The bush 7 is formed from fiber, or some other material suitable for the purpose. The stuffing box 9 is provided with a gland 1 secured thereto in the usual manner. In a globe valve provision may be made for an opening in the butt-end of the casing or body for renewal or re-grinding of the disk and bush 6. Such opening is closed by means of a cap or hood 10.

The stuffing-box as shown in Fig. 3 is provided with an annular integral flange 11, the under side of which rests upon the upper end of the chamber A to close the same. The shoulder 8 is of sufficient width to overhang the chamber of the stuffing-box, thereby engaging the bush and holding the same firmly seated, but the bushing is readily removable, when desired upon removal of the hub 13. The flanged base 11' of the hub 13 engages the flange 11, thus holding the same in place, as clearly shown in Fig. 3.

Among the advantages of our construction are:—The force and pressure, instead of being on the threads of the stem when the valve is closed, is against the disk itself pressing it more snugly into its seat; the seat may be made any desired depth, thus admitting of the disk seating itself more effectively; the ready removal of the bush and the substitution therefor of a new bush, and the easy access to and removal of the disk for repairs or re-grinding. This construction also makes the operation of the valve extremely simple and easy even under extraordinary pressure.

Although the novelty is more fully embodied in Fig. 3., Figs. 1 and 2 show forms of the device which might be found preferable under certain conditions.

Having thus described our invention, what we claim as new and desire to secure by Letters Patent is,

A valve comprising a casing having a seat mounted therein, a stuffing-box depending into the casing and having an annular flange for closing the upper end of the casing, a hub having a flanged base for attachment to the casing, said base serving to clamp the flange of the stuffing-box to said casing, a bush removably mounted in the stuffing box, said hub having a shoulder which overhangs the chamber of the stuffing-box for engaging the bush to hold the same against accidental removal from the stuffing box, a stem operable in the bush and stuffing-box, a disk carried by the lower end of the stem for engaging the seat when said stem is moved upwardly.

CHARLES S. ALLENDER.
GEORGE G. McNEE.

Witnesses:
REYNOLD ALSTRUM,
LYDIA E. KRAETTLI.

Copies of this patent may be obtained for five cents each, by addressing the "Commissioner of Patents, Washington, D. C."